United States Patent [19]
Ritter

[11] Patent Number: 5,714,128
[45] Date of Patent: Feb. 3, 1998

[54] SEQUENTIAL BATCH CHEMICAL APPARATUS FOR DESTRUCTION OF TOXIC ORGANIC COMPOUNDS

[76] Inventor: Robert A. Ritter, 407-1274 Barclay St., Vancouver, Canada, V6E 1H3

[21] Appl. No.: 695,005

[22] Filed: Aug. 9, 1996

Related U.S. Application Data

[62] Division of Ser. No. 39,889, Mar. 30, 1993, Pat. No. 5,545,799.

[51] Int. Cl.$^6$ .................................................. B01J 8/02
[52] U.S. Cl. ...................... 422/211; 422/159; 422/232; 588/200; 588/201
[58] Field of Search ............................ 422/211, 129, 422/159, 172, 187, 188, 198, 232; 588/200, 201

[56] References Cited

U.S. PATENT DOCUMENTS

| | | | |
|---|---|---|---|
| 3,719,570 | 3/1973 | Lancy | 201/151 |
| 3,810,788 | 5/1974 | Steyermark | 588/200 |
| 4,302,424 | 11/1981 | Miyake et al. | 422/159 |
| 4,449,005 | 5/1984 | Davis et al. | 568/59 |
| 4,565,787 | 1/1986 | Bossle et al. | 436/120 |
| 4,744,917 | 5/1988 | Scavdera et al. | 252/187.28 |
| 4,793,831 | 12/1988 | Dirks et al. | 55/20 |
| 4,797,128 | 1/1989 | Fowler | 8/137 |
| 4,949,641 | 8/1990 | Sayles | 588/200 |
| 5,104,524 | 4/1992 | Eiben et al. | 210/85 |
| 5,298,233 | 3/1994 | Nagel | 423/580.1 |
| 5,403,563 | 4/1995 | Crosbie et al. | 422/261 |
| 5,574,203 | 11/1996 | Noel et al. | 588/203 |

*Primary Examiner*—Christopher Kim
*Attorney, Agent, or Firm*—Harry M. Weiss; Jeffrey D. Moy; Harry M. Weiss & Associates, P.C.

[57] ABSTRACT

An apparatus process is provided for the destruction of a toxic organic chlorine-containing compound, especially, a chlorine- and arsenic-containing compound. The apparatus includes a main reactor into which is introduced the chlorine-containing compound, e.g., a Lewisite as a mustard gas, an oxidizing agent and a pH controlling agent, the main reactor including a hot heat exchanger and a cold heat exchanger, a source of inert blanketing gas to provide an oxidation product of the organic original chlorine-containing compound. Preferably, after completion of the oxidizing reaction, any residual oxidizing agent is catalytically decomposed. Then, the oxidation product of the original organic chlorine-containing compound, is preferably decomposed in a catalyst containing vessel at an alkaline pH, e.g., to a maximum final pH of about 11 in a liquid knockout vessel which includes a lower liquid discharge and an upper gaseous discharge connected to a vented absorber vessel to provide an inorganic compound, e.g. an inorganic arsenic-containing-compound. Such compound can easily and safely be disposed of.

6 Claims, 1 Drawing Sheet

SEQUENTIAL BATCH CHEMICAL APPARATUS FOR DESTRUCTION OF TOXIC ORGANIC COMPOUNDS

CROSS REFERENCE TO RELATED APPLICATIONS

This application is a division of application Ser. No. 08/039,889 filed Mar. 30, 1993, U.S. Pat. No. 5,545,799, the entire contents of which are incorporated herein by reference.

BACKGROUND OF THE INVENTION

1. Field of the Invention

This invention relates to procedures and apparatus useful for safely destroying toxic arsenic-containing chemicals, e.g., obsolete chemical warfare agents.

2. Description of the Prior Art

In recent years with the global emphasis on the reduction of the huge stockpile of chemical warfare agents, the art has been confronted with the problem of safely destroying and disposing of a variety of obsolescent chemical warfare agents, e.g., mustard gas and Lewisite.

Large quantities of chemical warfare agents, in various forms, are contained in a wide spectrum of munitions ranging from tactical ordnance to ballistic missiles, while equally large quantities are found in storage vessels with capacities ranging from a few grams to several tonnes. The problem of treatment and disposal is, therefore, severely complicated, not only by the extreme toxicity of quite infinitesimal quantities of these agents, but also by the need to simplify their recovery and to minimize the number of transfer and handling steps.

Where the technique of incineration is permitted, certain of these agents, including mustard gas and the nerve gases, may be totally destroyed through thermal oxidation, since the products of combustion, e.g., sulfur dioxide, may be readily contained and prevented from escaping to the atmosphere.

On the other hand, the Lewisites; [i.e., dichloro(2-chlorovinyl)arsine, bis(2-chlorovinyl)chloroarsine and tris (2-chlorovinyl)arsine], which comprises approximately 36 weight percent arsonic, upon combustion produce the highly toxic arsonic trioxide. Under conditions normally experienced in incinerator operation, it is extremely difficult to limit the release of this contaminant to the atmosphere at acceptably low rates.

Numerous chemical neutralization techniques have been proposed in the literature based on an alkaline oxidation, e.g., as taught in Canadian Patent No. 304,110 patented Sep. 23, 1990 by C. D. Carpenter. A large proportion of these techniques are based on hydrolysis of the Lewisite I in an aqueous alkaline medium. The reaction involved may be represented by the equation:

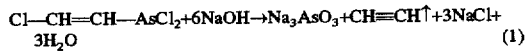

$$Cl-CH=CH-AsCl_2+6NaOH \rightarrow Na_3AsO_3+CH\equiv CH\uparrow+3NaCl+3H_2O \quad (1)$$

Although the hydrolysis approach, especially at somewhat elevated temperatures, is capable of effectively destroying virtually all of the principal Lewisite specie, known as Lewisite I, the associated species, Lewisite II and Lewisite III (previously generically-termed "the Lewisites") are considerably more resistant to hydrolysis and will, to a considerable extent survive this treatment. The secondary species, though milder vesicants than the principal analogue, are nonetheless toxic and cannot be tolerated as a component of the reaction products.

Another undesirable feature of the hydrolysis procedure is the formation of a trivalent arsenic compound, sodium arsenite which represents one of the most toxic forms of arsenic. Moreover, since this product is extremely soluble, some considerable difficulty is encountered in achieving its secure, permanent disposal.

A second popular approach suggested in the literature involves oxidation of the Lewisite with the aid of some oxidizing agent, e.g., sodium hypochlorite (NaOCl), chlorine ($Cl_2$), hydrogen peroxide ($H_2O_2$) or nitric acid ($HNO_3$).

Although complete oxidation may be possible with the nitric acid, reagents, e.g., hypochlorites and peroxides were, under the conditions investigated, found to be capable of only partial oxidation in accordance with the following reactions:

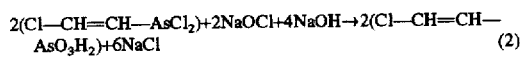

$$2(Cl-CH=CH-AsCl_2)+2NaOCl+4NaOH \rightarrow 2(Cl-CH=CH-AsO_3H_2)+6NaCl \quad (2)$$

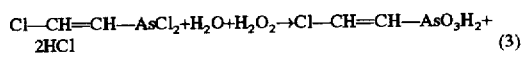

$$Cl-CH=CH-AsCl_2+H_2O+H_2O_2 \rightarrow Cl-CH=CH-AsO_3H_2+2HCl \quad (3)$$

In each instance, a final product of the reaction is a chlorovinyl arsonic acid which, though less noxious than the original Lewisite, is nevertheless highly toxic and represents a significant final disposal problem.

It should be noted that products analogous to the arsonic acid produced by the oxidation of Lewisite I are derived from similar oxidations of Lewisite II and Lewisite III and that these constitute comparable disposal problems.

SUMMARY OF THE INVENTION

Aims of the Invention

In view of these considerations, a more attractive approach to the neutralization of the Lewisites would be based on some form of chemical decomposition, especially if this procedure could be accomplished at moderate temperatures and if the resulting arsonic compounds were readily disposable and of minimal toxicity.

One object of the present invention is to provide a novel apparatus for the carrying out of the above chemical destruction which utilizes unsophisticated processing equipment and procedures.

Statements of Invention

The present invention provides a sequential process for the destruction of a toxic organic chlorine-containing compound comprising the steps of: (A) carrying out an oxidation reaction between the chlorine-containing compound and an oxidizing agent, while maintaining the temperature and the pH within preselected ranges, thereby to provide an intermediate organic chlorine-containing oxidation product of the original toxic organic chlorine-containing compound; and (B) converting the intermediate organic chlorine-containing oxidation product into easily disposable inorganic compounds.

The present invention also provides a sequential batch chemical apparatus comprising: (A) a main reactor; (B) a source of a first chemical reactant operatively connected to an inlet to the main reactor; (C) a source of a second chemical reactant operatively connected to another inlet to the main reactor; (D) a source of a third chemical reactant operatively connected to yet another inlet to the main reactor; (E) a source of an inert blanketing gas operatively connected to still another inlet to the main reactor; (F) an interim storage tank selectively operatively connected to an outlet from the main reactor; (G) a hot exchanger selectively operatively connected to the outlet from the main reactor and selectively operatively connected to a main inlet to the main reactor vessel; (H) a cold exchanger selectively operatively connected to the outlet from the main reactor and selectively operatively connected to a main inlet to the main reactor; (I) a catalyst-containing vessel selectively operatively connected to an outlet from either the hot exchanger or the cold exchanger and selectively operatively connected to a main inlet to the main reactor; (J) a liquid knockout vessel operatively connected to an outlet from an upper portion of the main reactor, the liquid knockout vessel having a lower liquid discharge and an upper gaseous discharge operatively connected to an absorber vessel which is vented to a flare, or to an incinerator or to a carbon bed.

Other Features of the Invention

By one feature of the apparatus of this invention, the apparatus may further include one or more of: an in-line mixer to mix reactants which are fed to the main reaction vessel; a probe to monitor temperature and pH; and a spray nozzle at the upper portion of the main reaction vessel.

Generalized Description of the Invention

In one specific feature, the present invention provides an integrated series of apparatus units, namely a reactor vessel, a catalyst chamber, Lewisite and reagent feed storage vessels, heat exchangers, pumps, valves and automatic controllers for performing the necessary chemical neutralization operations.

The present invention thus provides a series of chemical treatment steps, carried out in a series of apparatus units involving oxidation, preferably (and essentially for Lewisite) followed by decomposition effectively to neutralize either or all of the three forms of the Lewisite and to produce inorganic reaction products which are readily disposable.

The oxidizing agent is preferably an approximately 5% to 30% aqueous solution of hydrogen peroxide. Although the equation (described above) indicates that one mole of peroxide is required to oxidize one mole of the Lewisite, actual consumption of this reagent is approximately 3 to 4 moles peroxide per mole of the Lewisite, due to decomposition of peroxide by impurities in the Lewisite, and the need to provide an excess to favour the oxidation reaction.

During the course of the oxidation, the pH is permitted to decrease to a level of about 1 to 2 pH units through systematic addition of an alkaline solution, e.g., aqueous sodium hydroxide. Following addition of the total quantity of the Lewisite, and prior to termination of the oxidation phase for a given batch, the pH is increased to a level of about 5 to 7 pH units through the further addition of the alkali solution. This reagent neutralizes the hydrogen chloride produced in the oxidation reaction illustrated in equation (3), thereby enhancing the destruction of the final traces of the Lewisite by limiting the extent of the reverse reaction. The sodium hydroxide consumed in this operation is approximately 2 moles per mole of the Lewisite. Temperature regulation in the range of 50° C. to 90° C. is achieved both through regulation of the Lewisite feed to the reactor and by circulating the reaction mixture through a heat exchanger at a controlled rate.

The oxidation reaction is terminated with an excess of peroxide remaining in the reaction vessel, with a residual Lewisite concentration of less than 1 mg/L and with a pH in the range of about 5 to 8.

The excess peroxide is destroyed by circulating the reaction mixture through a bed of catalyst, e.g., manganese dioxide, at a controlled rate to limit the temperature rise and to prevent an uncontrollable rate of oxygen generation and, hence, foaming. The decomposition reaction, which reduces the residual peroxide to less than 0.1%, may be represented by the equation:

$$2H_2O_2 + (catalyst) \rightarrow 2H_2O + O_2. \quad (4)$$

During the peroxide removal process, the pH is maintained at a level of about 5 to 7 through the addition of aqueous sodium hydroxide. Total consumption of alkali for this purpose is approximately 0.12 moles per mole of original Lewisite feed. Control of the pH at this stage is rather critical since, at levels which are too low, e.g., less than 4, the rate of catalytic peroxide decomposition is extremely low while at a high pH, e.g., above about 9, both acetylene and oxygen may be evolved simultaneously, thereby creating a potentially explosive mixture.

In the interests of safety, the reactor is purged with nitrogen during the peroxide decomposition reaction to ensure that all of the oxygen is removed prior to the next step which unavoidably involves acetylene evolution.

The arsonic acid product, formed by the oxidation reaction, illustrated in equation (3), is decomposed, under a constantly purging nitrogen blanket, by the upward adjustment of the pH to a level ranging from 10 to 12 through the addition of a 10% to 30% aqueous solution of an alkali, e.g., to sodium arsenate by the addition of sodium hydroxide. This reaction may be represented by the equation:

$$Cl-CH=CH-AsO_3H_2 + 4NaOH \rightarrow Na_3AsO_4 + CH \equiv CH\uparrow + NaCl + 2H_2O. \quad (5)$$

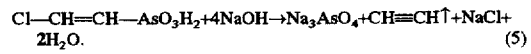

Due to the hazards associated with the acetylene evolved during the course of this slightly exothermic reaction, alkali addition is carefully controlled at a low rate, the reaction mixture is both stirred vigorously and circulated through the heat exchanger and the system is continuously purged to a vent (or through a carbon bed, or to a combustion device under those circumstances where the acetylene content rises above acceptable levels for venting) with the aid of a high flow rate of an inert gas, e.g., nitrogen.

The sodium hydroxide consumed during the acid decomposition operation identified by equation (5), is approximately 0.7 moles per mole of the Lewisite feed.

The oxidizing agent should be hydrogen peroxide employed as an approximately 10% to 25% aqueous solution, since this reagent is both highly efficient in destroying the Lewisite and it is more safely handled than the conventional alternatives. To accommodate both peroxide decomposition losses and to ensure complete destruction of the Lewisite, the excess peroxide initially charged to the reactor should be approximately 400% above the stoichiometric requirement.

The preferred pH of the reaction mixture is about 6 during Lewisite oxidation, about 6 during excess peroxide decomposition and about 11 during the final decomposition of the arsonic acid. The preferred alkali for the oxidation, peroxide decomposition and arsonic acid decomposition processes is sodium hydroxide, since this reagent is relatively inexpensive, readily available and entirely suited to its purpose. The total quantity of sodium hydroxide required for the combined operations is 3 moles per mole of the Lewisite charged.

The desired reaction temperature for each stage of the process is about 75° C. to about 85° C. since, at this level, boiling of the aqueous charge is easily avoided, while the rates of the desired reactions are high and readily controllable.

The sequence of introducing the major reactants to the system should comprise a pre-charging of the reactor with the oxidizing agent followed by the gradual introduction of Lewisite at a rate which permits reliable maintenance of the desired reaction temperature. The addition of peroxide to a charge of the Lewisite is a less desirable procedure since, in the event of an emergency, the larger quantity of the warfare agent present in the system throughout the course of the reaction constitutes a substantially more serious hazard.

The preferred catalyst for the excess peroxide destruction process is manganese dioxide, since it affords satisfactory control of the decomposition reaction. Moreover, it is readily available and is stable in and essentially unaffected by the reaction mixture.

Disposal of the sodium arsenate product from the decomposition reaction illustrated in equation (5) may be accomplished by precipitating the arsenate as calcium arsenate through the addition of a calcium donor, e.g., calcium chloride. The resulting precipitate is then stabilized within a cement monolith, created in the conventional manner well known in the hazardous waste treatment industry.

Stabilization of the sodium arsenate may, alternatively, be accomplished by adding sodium silicate and sodium sulfate to the reaction product identified in equation (5), each in a ratio of approximately 1 part reagent to 8 parts reaction product. The resulting mixture, in which the arsenic has become chemically entrapped by the silicate, is then incorporated into a cement monolith similar to that indicated above.

The preferred method for stabilizing the sodium arsonate product comprises the formation of a cement-based monolith through the thorough blending and curing of the following mixture of ingredients: 40 parts of the total reaction mixture; 5 parts of sodium silica; 5 parts sodium sulfate, and parts Portland cement.

In respect of the destruction of mustard gas, the chemical reactions may be specified as follows:

Reactions
First Step

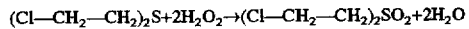
$(Cl—CH_2—CH_2)_2S+2H_2O_2 \rightarrow (Cl—CH_2—CH_2)_2SO_2+2H_2O$

Second Step

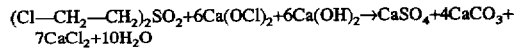
$(Cl—CH_2—CH_2)_2SO_2+6Ca(OCl)_2+6Ca(OH)_2 \rightarrow CaSO_4+4CaCO_3+7CaCl_2+10H_2O$ Overall Reaction

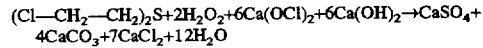
$(Cl—CH_2—CH_2)_2S+2H_2O_2+6Ca(OCl)_2+6Ca(OH)_2 \rightarrow CaSO_4+4CaCO_3+7CaCl_2+12H_2O$

BRIEF DESCRIPTION OF THE DRAWINGS

In the accompanying drawing, the single FIGURE is a schematic representation of one embodiment of apparatus units useful for carrying out the process of the present invention.

DESCRIPTION OF THE DRAWING

Figure 1:
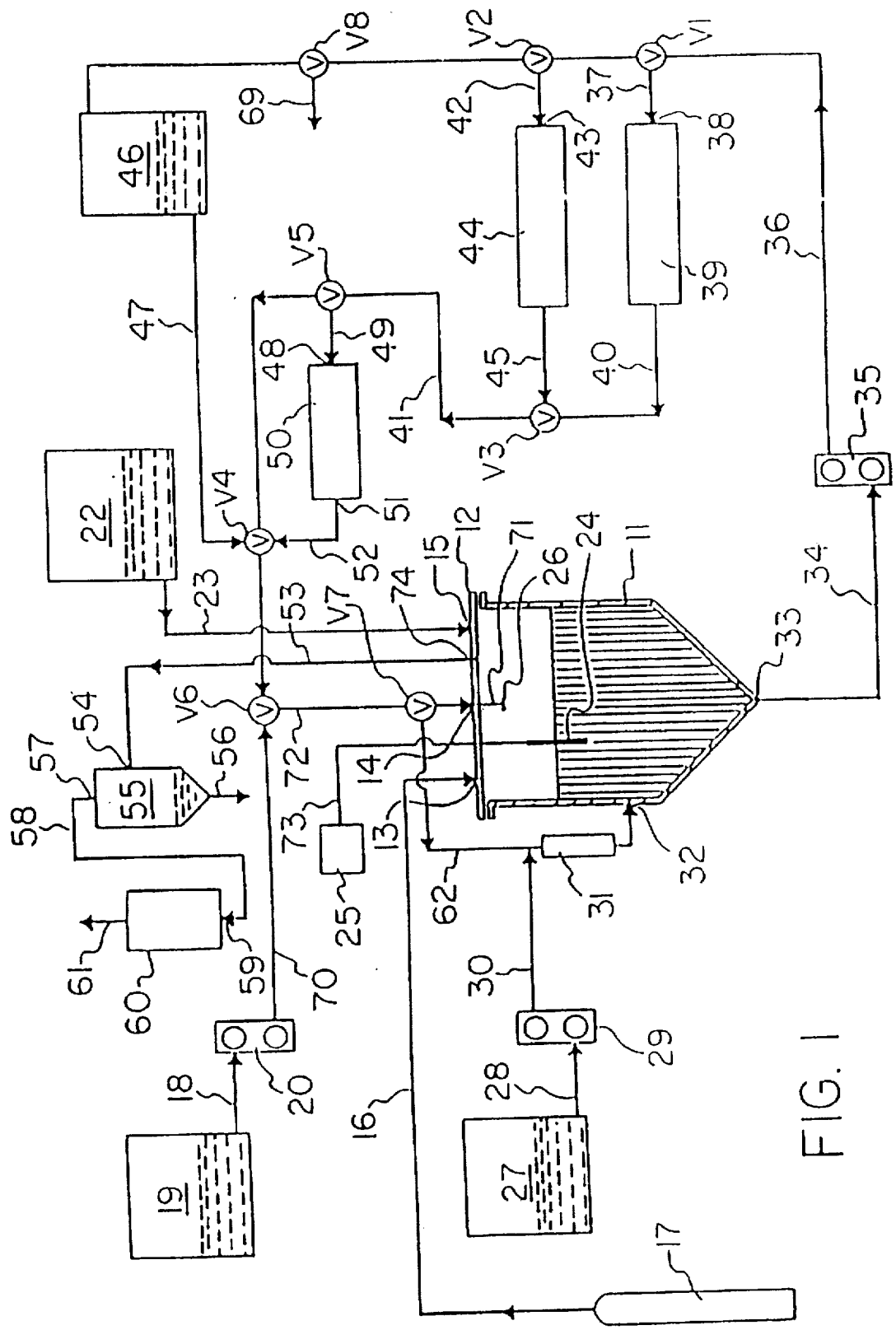

As seen in the drawing, the sequential batchwise apparatus includes a reactor 11 provided with a sealing cover 12 having three inlet ports 13, 14, 15. Inlet port 13 is connected by line 16 to a nitrogen source 17 to provide a nitrogen blanket, as required, in reactor 11. Inlet port 14 is connected via line 21 through valve V6 to line 21a from pump 20 which can pump a neutralizing agent, e.g., NaOH, from tank 19 by way of line 18. Inlet 14 is connected to spray nozzle 26 within the vessel 11. Inlet port 15 is connected to tank 22 via line 23 to feed oxidizing agent, e.g., $H_2O_2$, to reactor 11.

Vessel 27 is connected through outlet line 28 and pump 29 to feed line 30, which is connected to in-line mixer 31 and to inlet port 32 of the reactor 11, to feed the toxic, organic, arsonic-containing compound to be destroyed, e.g., either or all of the three Lewisites, to the reactor 11.

The lower discharge outlet 33 of the reactor 11 is connected via outlet line 34 and pump 35 to main flow line 36. A first branch line 37 at valve V1 is connected to the inlet 38 of cold exchanger 39, the outlet line 40 thereof being connected via recycle line 41 to the flow direction valve V7. Then it passes to inline mixer 31 through line 62. A second branch line 42 is connected at valve V2 to the inlet 43 of hot exchanger 44, the outlet line 45 thereof being connected via flow direction valve V3 to recycle line 41 and thence to the flow direction valve V7. Then it passes to inline mixer 31 through line 62.

Main flow line 36 also finally is connected to an interim storage tank 46 whose outlet 47 is connected to recycle line 41 at control valve V4. In addition, main flow line is connected, at valve V8 to withdrawal line 69 for discharge of product to stabilization, and disposal.

Recycle line 41 is connected by line 49, at valve V5, to the inlet 48 of a regeneration vessel 50, the outlet 51 thereof being connected by line 52 to recycle line 41 at control valve V4.

The conditions within reactor 11 are monitored by means of pH and temperature probe 24 connected to monitor 25.

A vapour line 53 is connected between reactor 11 and a liquid knockout vessel 55 at inlet 54, whose outlet 57 is connected by line 58 to an absorber 60 which vents, by line 61, to flare, if required, or to a carbon bed.

DESCRIPTION OF PREFERRED EMBODIMENTS

The operation of the process of one embodiment of this invention preferably involves the following steps: a quantity of about 10% to 25% aqueous hydrogen peroxide, equal in molar terms to five times the quantity of Lewisite to be neutralized in each batch, is transferred from the vessel 22 to the reactor 11 and is heated to approximately 55° C. by means of recirculation through the hot exchanger 44.

An aliquot of the Lewisite to be destroyed is introduced into the reactor 11 from vessel 27 to initiate the exothermic oxidation reaction.

The temperature in reactor 11 is allowed to rise under careful control achieved by appropriate direction of the reacting mixture through one or other of the two exchangers 39 and 44. When thermal stability is assured, a continuous flow of Lewisite is permitted to enter the reactor 11 at a rate determined by the capacity of the cold exchanger 39, to remove the heat generated by the reaction and thereby to maintain a constant temperature of at least 75° C. throughout the course of the reaction. In order to avoid loss of temperature control of the oxidation reaction, the Lewisite feed is blended directly and efficiently with the high flow rate, recirculating stream of reactor fluids passing through an in-line mixer 31.

The decrease in pH, resulting from the formation of HCl, a product of the oxidation reaction, is counteracted through the controlled addition of a 20% aqueous solution of NaOH, obtained from vessel 19. Prior to termination of the reaction, the pH is increased to a level of approximately 6 pH units.

The production of a relatively stable foam, which may occasionally form in the reactor as a result of impurities in the Lewisite, is adequately controlled by directing a portion of the recirculating reaction mixture, by means of valve V7, through the spray nozzle 26 located above the liquid surface at the top of the reactor 11.

Upon completion of the oxidation reaction, that is, when the specified quantity of Lewisite has been added and the residual Lewisite in the reaction product mixture has decreased to a level below about 1 mg/L, the remaining hydrogen peroxide is destroyed by passing the reaction mixture through the manganese dioxide catalyst bed in regeneration vessel 50. During the course of this operation, the temperature and pH continue to be controlled by procedures similar to those outlined above.

When the residual peroxide concentration has fallen to a level of less than 0.1%, flow through the catalyst bed in regeneration vessel 50 is discontinued, and NaOH solution from vessel 19 is gradually introduced to the reactor 11, thereby slowly decomposing the arsonic acid at a constant temperature of about 75° C., and eventually elevating the pH to a final level of 11. The decomposition reaction is permitted to continue until the concentration of arsonic acid has decreased to less than 1 mg/L.

The reaction mixture is cooled and removed from the reactor via main flow line 36 to temporary storage in vessel 46. The entire neutralization process described above is then, repeated through the number of cycles required to eliminate the designated inventory of Lewisite.

The combined volume of fluid reaction products, generated by the above series of neutralizations, is then withdrawn via line 69 and mixed with sodium silicate, sodium sulfate and Portland cement, in the following proportions; 40 parts reaction product, 5 parts sodium silicate, 5 parts sodium sulfate and 50 parts Portland cement, with the aid of conventional cement blending equipment. The resulting mixture is, then, cast in the form of one or more monoliths. The monoliths subject to passing the leachate test results, may be placed into a secure landfill as a generally-acceptable strategy for permanent disposal.

As the result of extensive laboratory and pilot plant investigation, followed by the design, construction and operation of an industrial scale system, it has been determined that: the batchwise mode of operation is most efficacious, since it offers greater flexibility in terms of feed capacity or rangeability; it may be controlled more simply and with greater safety, especially in the event of a runaway reaction; it permits the use of a single reaction vessel for oxidation and decomposition; and it limits the quantity of unreacted Lewisite present in the system at any time.

Although a continuous process may be readily devised to effect the destruction of the Lewisite by the process of this invention, a sequential or batchwise approach is preferred, since it provides greater flexibility and controllability.

All services of vessels, pipes, tube, valves, pumps and probes which are contacted by process fluids (liquids and/or gases) should be composed of either glass, TEFLON™ (the registered trade-mark for a brand of polytetrafluoroethylene) or ceramic to resist chemical attack in a strongly oxidizing atmosphere at moderately elevated temperature.

In respect of the destruction of mustard gas the basic theroretical data leading to this embodiment of the present invention invention may be described as follows:

BASIC DATA:

| SPECIES | MOLECULAR WEIGHT | HEAT OF FORMATION (BTU/# MOLE) |
|---|---|---|
| HD | 159 | +89,500 (calculated) |
| $H_2O_2$ | 34 | −80,500 |
| $Ca(OCl)_2$ | 143 | −323,300 |
| $Ca(OH)_2$ | 74 | −429,700 |
| $CaSO_4$ | 136 | −622,300 |
| $CaCO_3$ | 100 | −522,800 |
| $CaCl_2$ | 111 | −375,900 |
| $H_2O$ | 18 | −122,500 |
| SULFONE | 191 | −200,000 (estimated) |

Heat of Reaction
As determined from the heats of formation
First Step: (to produce sulfone)
−2,350 BTU/# of HD
Overall Reaction
−14,000 BTU/# of HD Therefore: the first step generates approximately 17% of the total heat of reaction.

In order to determine the material balance for these reactions one must make the following assumptions:

1. The reactions are carried out sequentially in a single batch with the HD added to the total peroxide in the first step and alkaline bleach added to the resulting mixture in the second step.
2. The basis for calculation is one mole of HD.
3. The initial peroxide concentration is 15%.
4. The excess peroxide is 100% above the stoichiometric requirement.
5. The bleach is a slurry of $Ca(OCl)_2$ and $Ca(OH)_2$ in a 50/50 molar mixture.
6. The aqueous bleach slurry is 30% $Ca(OH)_2$ excluding the $Ca(OCl)_2$.
6. The excess bleach is 100% above the stoichiometric requirement.

This provides the following balance:

| SPECIES | INPUT (#/mole HD) | OUTPUT (#/mole HD) | OUTPUT (#/# HD feed) |
|---|---|---|---|
| Reactants | | | |
| HD | 159 | 0 | — |
| $H_2O_2$ | 136 | 68 | 0.428 |
| $Ca(OCl)_2$ | 1,716 | 858 | 5.396 |
| $Ca(OH)_2$ | 888 | 444 | 2.792 |
| $H_2O$ | 12,843 | 12,843 | 17.881 |
| Products | | | |
| $CaSO_4$ | | 136 | 0.855 |
| $CaCO_3$ | | 400 | 2.515 |
| $CaCl_2$ | | 777 | 4.886 |
| $H_2O$ | | 216 | 1.358 |
| TOTAL | 5742 | 5742 | 36.111 |

Output
Total product—5742#/#mole HD or 36.11#/#HD or 144.5 tons/4 tons HD
Water—3059#/#mole HD or 19.24#/#HD or 76.96 tons/4 tons HD Then gives the following product analysis:

| SPECIES | TOTAL PRODUCT % | IN SOLUTION % |
|---|---|---|
| $H_2O_2$ | 1.18 | 1.42 |
| $Ca(OCl)_2$ | 14.94 | 17.97 |
| $Ca(OH)_2$ | 7.73 | 0.11 |
| $CaSO_4$ | 2.37 | 0.13 |
| $CaCO_3$ | 6.97 | 0.0 |
| $CaCl_2$ | 13.53 | 16.28 |
| $H_2O$ | 53.28 | 64.09 |

CONCLUSION

Thus, the present invention has provided a process which employs a sequence of chemical reactions effectively to reduce the several species of the vesicant, Lewisite, a warfare agent, to less noxious and readily disposable end products, and the method of operating such a process.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

What I claim is:

1. A sequential batch chemical apparatus comprising: (A) a main reactor; (B) a source of a first chemical reactant operatively connected to an inlet to said main reactor; (C) a source of a second chemical reactant operatively connected to another inlet to said main reactor; (D) a source of a third chemical reactant operatively connected to yet another inlet to said main reactor; (E) a source of an inert blanketing gas operatively connected to still another inlet to said main reactor; (F) an interim storage tank selectively operatively connected to an outlet from said main reactor; (G) a hot heat exchanger selectively operatively connected to an outlet from said main reactor and selectively operatively connected to a main inlet to said main reactor vessel; (H) a cold heat exchanger selectively operatively connected to an outlet from said main reactor and selectively operatively connected to a main inlet to said main reactor; (I) a catalyst-containing vessel selectively operatively connected to an outlet from either said hot heat exchanger or said cold heat exchanger and selectively operatively connected to a main inlet to said main reactor; (J) a liquid knockout vessel operatively connected to an outlet from an upper portion of said main reactor, said liquid knockout vessel having a lower liquid discharge and an upper gaseous discharge operatively connected to an absorber vessel which is vented.

2. The apparatus of claim 1 wherein said gaseous discharge is vented to a flare.

3. The apparatus of claim 1 wherein said gaseous discharge is vented to a carbon absorbed bed.

4. The apparatus of claim 1 including an in-line mixer to mix reactants which are fed to said main reactor.

5. The apparatus of claim 1 including a probe to monitor temperature and pH.

6. The apparatus of claim 1, including a spray nozzle within an upper portion of said main reactor.

* * * * *